(12) United States Patent
Zhang et al.

(10) Patent No.: US 10,877,788 B2
(45) Date of Patent: Dec. 29, 2020

(54) PROCESSING VECTORIZED GUEST PHYSICAL ADDRESS TRANSLATION INSTRUCTIONS

(71) Applicant: Intel Corporation, Santa Clara, CA (US)

(72) Inventors: Fan Zhang, Limerick (IE); Bruce Richardson, Shannon (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/299,914

(22) Filed: Mar. 12, 2019

(65) Prior Publication Data

US 2019/0205149 A1    Jul. 4, 2019

(51) Int. Cl.
| | | |
|---|---|---|
| *G06F 12/00* | (2006.01) | |
| *G06F 9/455* | (2018.01) | |
| *G06F 9/30* | (2018.01) | |
| *G06F 12/1027* | (2016.01) | |

(52) U.S. Cl.
CPC ...... *G06F 9/45545* (2013.01); *G06F 9/30181* (2013.01); *G06F 9/4555* (2013.01); *G06F 9/45558* (2013.01); *G06F 12/1027* (2013.01); *G06F 2009/45583* (2013.01)

(58) Field of Classification Search
CPC ............. G06F 12/1009; G06F 9/45545; G06F 9/30181; G06F 9/4555; G06F 9/45558; G06F 12/1027; G06F 2009/45583
See application file for complete search history.

(56) References Cited

U.S. PATENT DOCUMENTS

| | | | | |
|---|---|---|---|---|
| 5,584,005 A | * | 12/1996 | Miyaoku ............. | G06F 12/0292 711/206 |
| 7,685,355 B2 | * | 3/2010 | Bond .................. | G06F 9/45537 703/27 |
| 9,400,652 B1 | * | 7/2016 | Barry .................. | G06F 9/30032 |
| 9,921,842 B2 | * | 3/2018 | Abdallah ............. | G06F 9/30058 |
| 2002/0091841 A1 | * | 7/2002 | Beukema ............. | G06F 12/145 709/229 |
| 2005/0231515 A1 | * | 10/2005 | Gurumoorthy ..... | G06F 12/1081 345/520 |

(Continued)

OTHER PUBLICATIONS

Extended European Search Report for Patent Application No. 201541943, dated Aug. 4, 2020, 10 pages.

*Primary Examiner* — Mano Padmanabhan
*Assistant Examiner* — Mohammad S Hasan
(74) *Attorney, Agent, or Firm* — Compass IP Law, PC

(57) ABSTRACT

Examples include a processor including fetch circuitry to fetch a guest physical address translation instruction having a format with fields to specify at least an opcode and locations of a source vector and a destination vector, decode circuitry to decode the fetched guest physical address translation instruction, and execution circuitry to execute the decoded guest physical address translation instruction. Execution of the decoded guest physical address translation instruction includes comparing guest physical addresses of the source vector with base and end addresses of a selected memory region, masking a guest physical address of the source vector if the guest physical address is in the selected memory region, translating the masked guest physical addresses into host addresses, and storing the host addresses into the destination vector.

23 Claims, 15 Drawing Sheets

(56) References Cited

U.S. PATENT DOCUMENTS

| | | | |
|---|---|---|---|
| 2007/0226471 A1* | 9/2007 | Kapustin | G06F 11/3648 |
| | | | 712/227 |
| 2008/0140971 A1* | 6/2008 | Dankel | G06F 12/1036 |
| | | | 711/163 |
| 2009/0182973 A1 | 7/2009 | Greiner et al. | |
| 2013/0283105 A1* | 10/2013 | Balasubramanian | ........................ |
| | | | G06F 11/0751 |
| | | | 714/48 |
| 2014/0006681 A1* | 1/2014 | Chen | G06F 12/1027 |
| | | | 711/3 |
| 2014/0281055 A1* | 9/2014 | Davda | G06F 12/0862 |
| | | | 710/26 |
| 2015/0186290 A1* | 7/2015 | Caprioli | G06F 12/1027 |
| | | | 711/207 |
| 2015/0278111 A1* | 10/2015 | Gschwind | G06F 12/1045 |
| | | | 711/122 |
| 2016/0048458 A1 | 2/2016 | Lutas et al. | |
| 2016/0065386 A1* | 3/2016 | Hari | H04L 12/4679 |
| | | | 370/254 |
| 2016/0154586 A1* | 6/2016 | Craske | G06F 3/0604 |
| | | | 711/202 |
| 2016/0342524 A1* | 11/2016 | Eddy | G06F 12/1027 |
| 2017/0032118 A1* | 2/2017 | Carson | G06F 21/52 |
| 2017/0262306 A1* | 9/2017 | Wang | G06F 9/50 |
| 2017/0344492 A1* | 11/2017 | Bolbenes | G06F 12/1027 |
| 2018/0060245 A1* | 3/2018 | Tsirkin | G06F 9/45558 |
| 2018/0060246 A1 | 3/2018 | Friedman et al. | |
| 2018/0074954 A1* | 3/2018 | Craske | G06F 7/02 |
| 2019/0026232 A1* | 1/2019 | Warkentin | H04L 12/4641 |

\* cited by examiner

MEMORY REGION VECTORS 300

| BASE 1 | BASE 1 | BASE 1 | • • • | BASE 1 | 302 |
| END 1 | END 1 | END 1 | • • • | END 1 | 304 |

| BASE 2 | BASE 2 | BASE 2 | • • • | BASE 2 | 306 |
| END 2 | END 2 | END 2 | • • • | END 2 | 308 |

•
•
•

| BASE M | BASE M | BASE M | • • • | BASE M | 310 |
| END M | END M | END M | • • • | END M | 312 |

PROCESSING VECTORIZED GUEST PHYSICAL ADDRESS TRANSLATION INSTRUCTIONS

BACKGROUND

The field of invention relates generally to computer processor architecture, and, more specifically, to systems and methods for processing vectorized guest physical address (GPA) translation instructions.

Virtual input/output device (I/O) device (Virtio) is a virtualization standard (as described in *Virtual I/O Device (VIRTIO) Version* 1.0, edited by Rusty Russell, Michael S. Tsirkin, Cornelia Huck, and Pawel Moll, Mar. 3, 2016, OASIS Committee Specification 04) for network and disk device drivers wherein a device driver of a guest virtual machine (VM) "knows" it is running in a virtual environment and cooperates with a hypervisor. This enables guest VMs to utilize high performance network and disk operations and supports performance benefits of paravirtualization. Virtio is commonly used to communicate as I/O channels between a host computing system and VMs. A Virtio descriptor includes an address pointing to a buffer in physical memory. This address is represented as a guest physical address (GPA). The host computing system translates the GPA into a recognizable host virtual address (HVA) and/or a host physical address (HPA). This process is called I/O translation.

One way of implementing I/O translation is to examine a host-maintained I/O translation lookaside buffer (IOTLB) cache table or memory region table to see if the GPA to be translated lies in the address range of a certain table entry. Once a matching entry is found, the hypervisor of the host computing system applies the starting HVA/HPA of the entry together with an offset to compute the final HVA or HPA. For multiple GPAs, this method is done in software in a sequential way, which consumes expensive processor resources and is slow.

BRIEF DESCRIPTION OF THE DRAWINGS

FIG. 3 illustrates memory region vectors in some embodiments.

DETAILED DESCRIPTION

Embodiments of the present invention provide a set of instructions in an instruction set architecture (ISA) to accelerate VM memory translation processes. In an embodiment, the instructions accelerate the process of converting a plurality of GPAs to host recognizable virtual and/or physical addresses in parallel.

Figure 1:
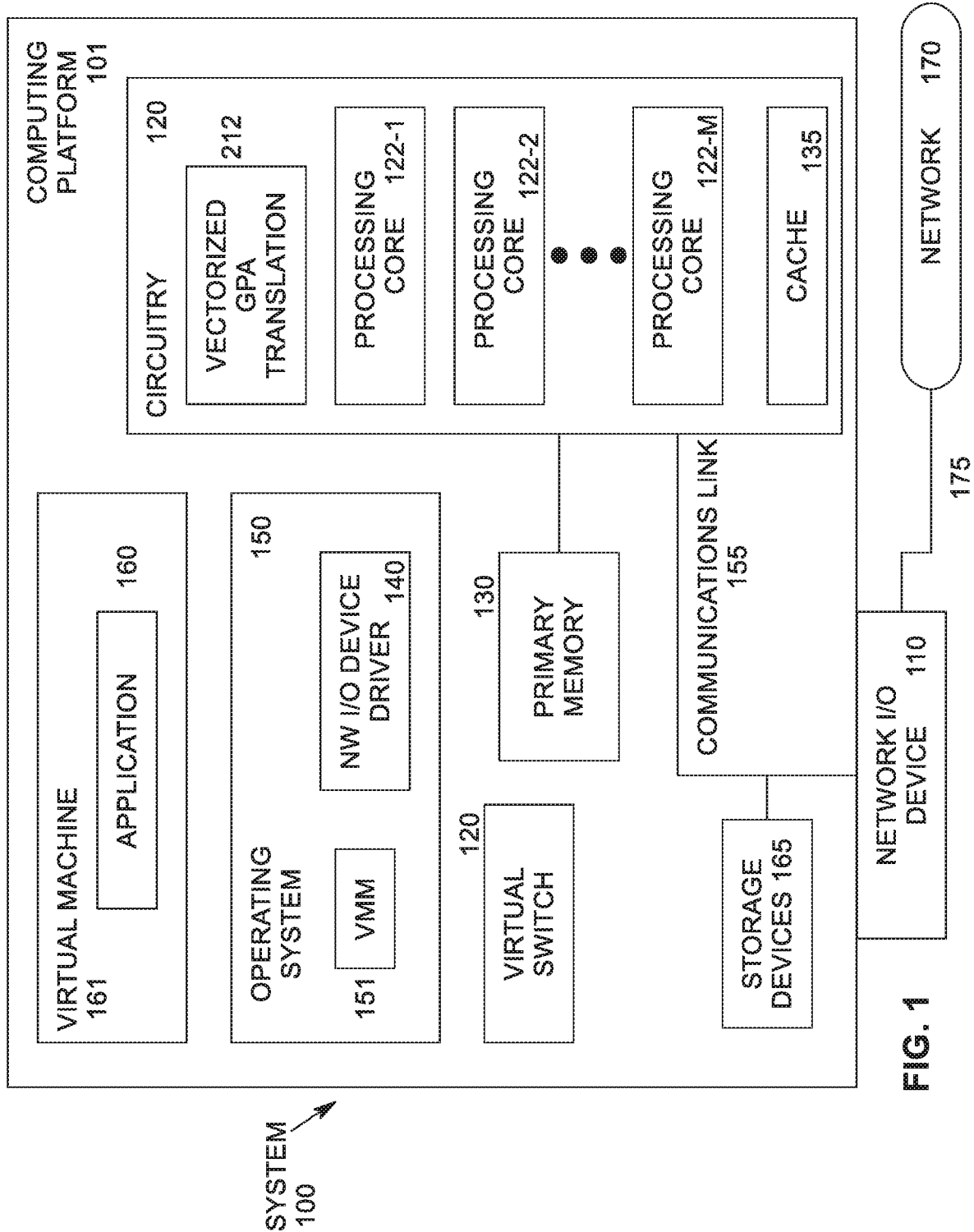
FIG. 1 illustrates an example computing system according to some embodiments.

FIG. 1 illustrates an example computing system 100. As shown in FIG. 1, computing system 100 includes a computing platform 101 coupled to a network 170 (which may be the Internet, for example). In some examples, as shown in FIG. 1, computing platform 101 is coupled to network 170 via network communication channel 175 and through at least one network I/O device 110 (e.g., a network interface controller (NIC)) having one or more ports connected or coupled to network communication channel 175. In an embodiment, network communication channel 175 includes a PHY device (not shown). In an embodiment, network I/O device 110 is an Ethernet NIC. Network I/O device 110 transmits data packets from computing platform 101 over network 170 to other destinations and receives data packets from other destinations for forwarding to computing platform 101.

According to some examples, computing platform 101, as shown in FIG. 1, includes circuitry 120, primary memory 130, network (NW) I/O device driver 140, operating system (OS) 150, virtual machine manager (VMM) (also known as a hypervisor), at least one application 160 running in a virtual machine (VM) 161, and one or more storage devices 165. In one embodiment, OS 150 is Linux™. In another embodiment, OS 150 is Windows® Server. Network I/O device driver 140 operates to initialize and manage I/O requests performed by network I/O device 110. In an embodiment, packets and/or packet metadata transmitted to network I/O device 110 and/or received from network I/O device 110 are stored in one or more of primary memory 130 and/or storage devices 165. In at least one embodiment, application 160 is a packet processing application operating in user mode. Computing platform 101 includes virtual switch 120 to send and receive packets to and from destinations external to computing platform 101 or internal to computing platform 101 (e.g., between containers/cores). In an embodiment, virtual switch 120 operates in kernel mode. In another embodiment, virtual switch 120 operates in user mode. In some embodiments, virtual switch 120 and/or OS 150 calls I/O functions using the Virtio transport protocol.

In at least one embodiment, storage devices 165 may be one or more of hard disk drives (HDDs) and/or solid-state drives (SSDs). In an embodiment, storage devices 165 may be non-volatile memories (NVMs). In some examples, as shown in FIG. 1, circuitry 120 may communicatively couple to network I/O device 110 via communications link 155. In one embodiment, communications link 155 is a peripheral component interface express (PCIe) bus conforming to version 3.0 or other versions of the PCIe standard published by the PCI Special Interest Group (PCI-SIG). In some examples, operating system 150, NW I/O device driver 140, virtual switch 120, VM 161, and application 160 are implemented, at least in part, via cooperation between one or more memory devices included in primary memory 130 (e.g., volatile or non-volatile memory devices), storage devices 165, and elements of circuitry 120 such as processing cores 122-1 to 122-$m$, where "m" is any natural number. In an embodiment, OS 150, VMM 151, NW I/O device driver 140, virtual switch 120, VM 161 and application 160 are executed by one or more processing cores 122-1 to 122-$m$.

In some examples, computing platform 101, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, or a combination thereof. In one example, computing platform 101 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 120 having processing cores 122-1 to 122-$m$ may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 120 may include at least one cache 135 to store data.

In some examples, circuitry 120 includes vectorized GPA translation circuitry 212 to process vectorized GPA translation instructions. In some embodiments, vectorized GPA translation circuitry 212 is integral with one or more processing cores 122-1, 122-2, . . . 122-M.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

A new set of advanced vector extensions (AVX) processor instructions are proposed in embodiments of the present invention. The instructions are used to, but are not limited to, accelerate the Virtio descriptor's I/O translation process by performing GPA translations in parallel in hardware.

Figure 2:
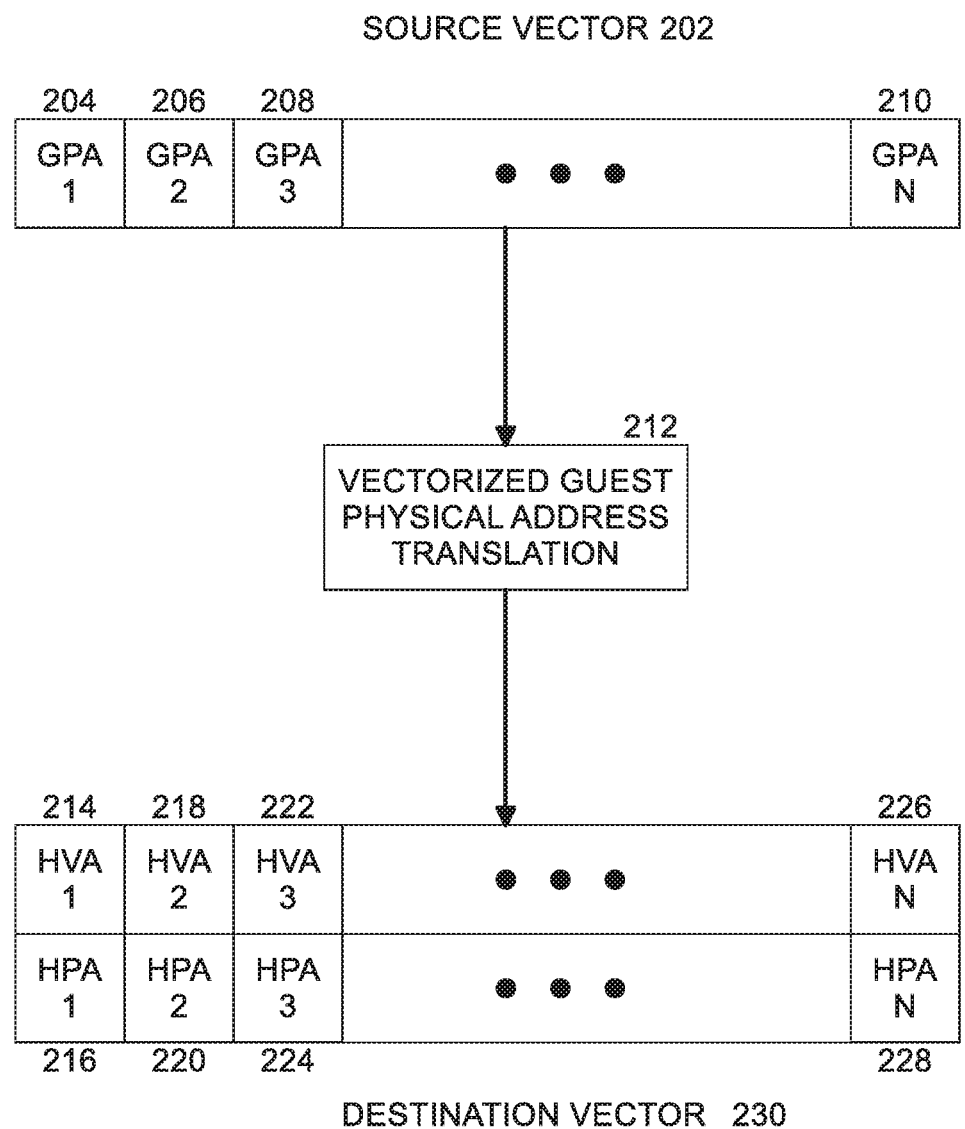
FIG. 2 illustrates input data to and output data from a vectorized GPA translation operation according to some embodiments.

FIG. 2 illustrates input data to and output data from a vectorized GPA translation operation according to some embodiments. Source vector 202 includes a plurality of GPAs, such as GPA 1 204, GPA 2 206, GPA 3 208, . . . GPA N 210, where N is the number of GPAs in source vector 202, N being a natural number. Source vector 202 is input to vectorized GPA translation circuitry 212, Vectorized GPA translation circuitry 212 translates, in parallel, each of the GPAs in source vector 202 to produce a plurality of HVAs, such as HVA 1 214, HVA 2 218, HVA 3 222, . . . HVA N 226, respectively, or HPA 1 216, HPA 2 220, HPA 3 224, . . . HPA N 228, respectively, depending on a selection by VMM 151.

The proposed instruction set application programming interface (API) is shown in Table 1.

TABLE 1

| Translate SIMD intrinsic |
| --- |
| ___mmXXX_io_translate_epiYY(___mXXXi src, ___mXXXi *bases, ___mXXXi *ends, ___mXXXi *dsts, u32 n_elements, u32 n_src_elements) |

In the instruction API shown in Table 1, XXX is the bit size of the instruction supported, which can be 512, 256, or 128 in various embodiments, and YY is the bit size of packed integer, which can be 64 (for a 64-bit OS) or 32 (for a 32-bit OS) in various embodiments. Additional operands include a source vector (src), a set of base addresses, a set of ending addresses, a destination vector (dsts), a number of elements, and a number of source elements.

An example of a 512-bit instruction to process packed 64-bit integers is shown in Table 2.

TABLE 2

Translate SIMD intrinsic

___m512i ___mm512_io_translate_epi64(___m512i src, ___m512i *bases, ___m512i *ends, ___m512i *dsts, u32 n_elements, u32 n_src_elements)

The operands of the API are:
1) src: a vector variable with YY-bit unsigned integers for source data. When used for translating a Virtio descriptor GPA, this is the GPA to be translated. The maximum number of elements in the variable depends on the XXX and YY sizes. For example, for AVX512 instructions the variable can contain maximum 8 64-bit elements or 16 32-bit elements.
2) bases: an array of vectors with starting values of each memory region. Each element in the array is the vector with same YY-bit values of the starting value of a range. In case of Virtio descriptor GPA translations, the elements are the starting physical addresses of each memory region.
3) ends: an array of end values of each region. Each element in the array is the vector with same YY-bit values of the ending value of a range. In case of Virtio descriptor GPA translations, the elements are the ending physical addresses of each memory region.
4) dsts: an array of starting addresses of translated regions. Each element in the array is the vector with same YY-bit values of the starting value of a range. In case of Virtio descriptor GPA translations, the elements are the HPAs or HVAs.
5) n_elements: number of elements in the array.
6) n_src_elements: number of valid elements in src.

The output of the I/O translate function will be the destination vector with YY-bit translated values. When an error occurs, in one embodiment the destination vector is set to a sentinel value indicating an error. In case of Virtio descriptor GPA translation, the destination vector stores the translated HPAs or HVAs.

FIG. 3 illustrates memory region vectors 300 in some embodiments. A selected portion of memory (such as primary memory 130) includes M regions, where M is a natural number. Each region R is defined by a base address and an end address. For example, region 1 is defined by a base 1 302 and an end 1 304. In an embodiment, each base/end pair is replicated in a memory region vector N times to support parallel processing, where N is the number of elements in source vector 202. Thus, an array of memory region vectors includes addresses for base 1 302 and end 1 304, for base 2 306 and end 2 308, . . . and for base M 310 and end M 312 as shown. In another embodiment, the range of addresses (e.g., base and end) is only specified once for each range. For example, in that embodiment eight sets of 64-bit base and end values can be stored in a 512-bit register.

In one example implementation, pseudocode for an AVX512 instruction to translate a maximum of 8 64-bit addresses is shown as below in Table 3. Other variations of instructions for 128-bit and 256-bit size instructions and for 32-bit packed integers sizes are similar. In some embodiments, processing as shown in Table 3 (and variations for the other instructions) are implemented in vectorized GPA translation circuitry 212.

TABLE 3

Pseudocode implementation of the AVX512 instruction for 64 bits

```
1    ___m512i ___mm512_io_translate_epi64(___m512i src, ___m512i *bases, ___m512i
2    *ends, ___m512i *dsts, u32 n_elements, u32 n_src_elements)
3    {
4        _MM_CMPINT_ENUM op1 = _MM_CMPINT_NLT;
5        _MM_CMPINT_ENUM op2 = _MM_CMPINT_LE;
6        ___m512i ret = _mm512_setzero_si512( );
7        ___mmask8 m = 0;
8        u32 i;
9
10       for (i = 0; i < n_elements; i++) {
11           ___mmask8 m1;
12           ___m512i found = _mm512_setzero_si512( );
13
14           /** Compare the boundary of the region, check if src lies in */
15           m1 = _mm512_cmp_epi64_mask(src, bases[i], op1);
16           m1 = _mm512_mask_cmp_epi64_mask(m1, src, ends[i], op2);
17
18           /** No luck, to next region */
19           if (!m1)
20               continue;
21
22           /** Convert to destination value with offset */
23           found = _mm256_mask_sub_epi64(found, m1, src, base[i]);
24           found = _mm512_mask_add_epi64(found, m1, found, dst[i]);
25
26           /** Set only the newly converted results */
27           ret = _mm512_mask_set1_epi64(ret, m1, found);
28           m |= m1;
29
30           if (___builtin_popcount(m) == n_src_elements)
31               break;
32       }
33
```

TABLE 3-continued

Pseudocode implementation of the AVX512 instruction for 64 bits

```
34     return ret;
35   }
```

In Table 3, an 8-bit mask m is used in the GPA translation process to track the status of the GPA translation and is set to 0 initially. Then the GPA translation process will loop a maximum of n elements times to go through all members of the bases and ends arrays. When the GPA translation process is executed to line 23, it is safe to assume at least one or more elements in src lies in the range between bases[i] and ends[1]. Line 23 and 24 are used to compute the HVA or HPA using bases[i] and dst[i]. A branch in line 30 is used to check if the job is finished.

Figure 4:
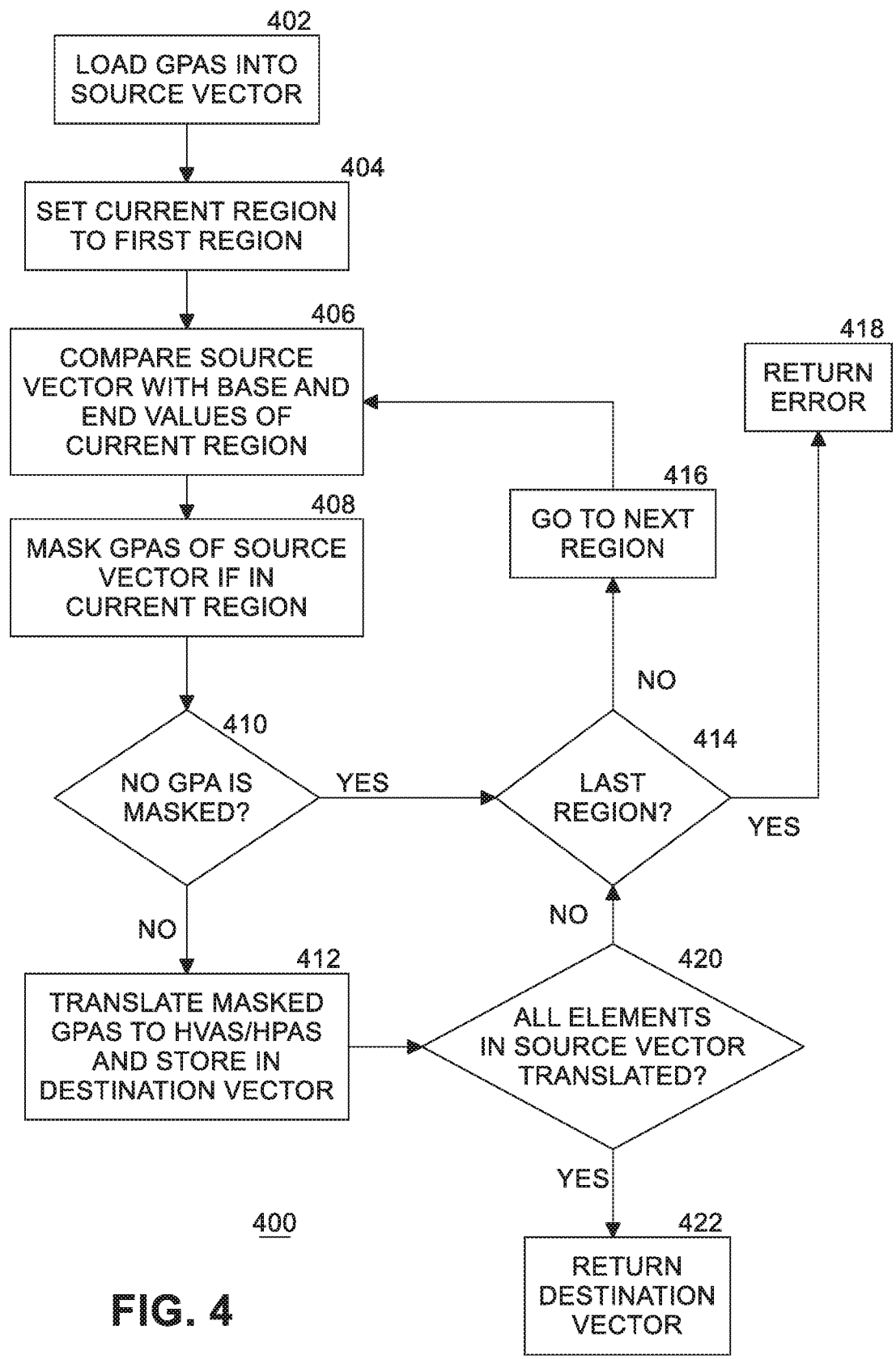
FIG. 4 is a flow diagram illustrating GPA translation operations according to some embodiments.

FIG. 4 is a flow diagram illustrating GPA translation operations according to some embodiments. In some embodiments, the actions described below are performed by vectorized GPA translation circuitry 212. At block 402, a plurality N of GPAs are loaded into source vector 202. At block 404, a current region is set to a first region of the memory region (e.g., region 1 as defined by base 1 302 and end 1 304). At block 406, each GPA of the source vector is compared with the base and end values of the current region (e.g., Rj (j ∈ 0 ... M−1), where j is the index of the current region). All GPAs are processed in parallel at block 406. At block 408, a GPA of the source vector is masked if the GPA is in the current region. At block 410, if no GPA of the source vector is masked at block 408, then processing continues with a check as to whether the last region has been processed at block 414 (e.g., the current region is the last region). If the last region has not been processed, go to the next region at block 416 (e.g., set the current region to the next region, looping through the M regions), and continue processing of the next region at block 406. If the last region has been processed at block 414 and no GPAs have been masked (meaning no GPAs of the source vector are in the selected memory regions specified by the instruction operands) then an error is returned at block 418. If at block 410 at least one GPA of the source vector has been masked for the current region, then processing continues with block 412, wherein each masked GPA is translated to a HVA or a HPA and stored in the destination vector (either 310 or 312). At block 420, if all elements of the source vector have not been translation, processing continues with block 414 to check for whether this is the last region. If all elements of the source vector have been processed, then the destination vector is returned at block 422 and GPA translation processing ends.

The proposed instruction set of embodiments of the present invention may improve the performance of GPA translations because multiple GPAs are translated in parallel. For example, the AVX512 version of the GPA translation instruction can translate a maximum of 8 64-bit or 16 32-bit values in parallel. The proposed instruction set is suited for a burst operation mode as is common in Data Plane Developer Kit (DPDK) applications. Since each operation in the burst is physically contiguous to each other, it is likely that all 8 addresses lie in the same region so they would be found matching in the same iteration of the loop shown in Table 3 at line 10. The proposed instruction set can be used not only for the Virtio GPA translation use case, but also for related use cases that require data range lookup operations.

Figure 5:
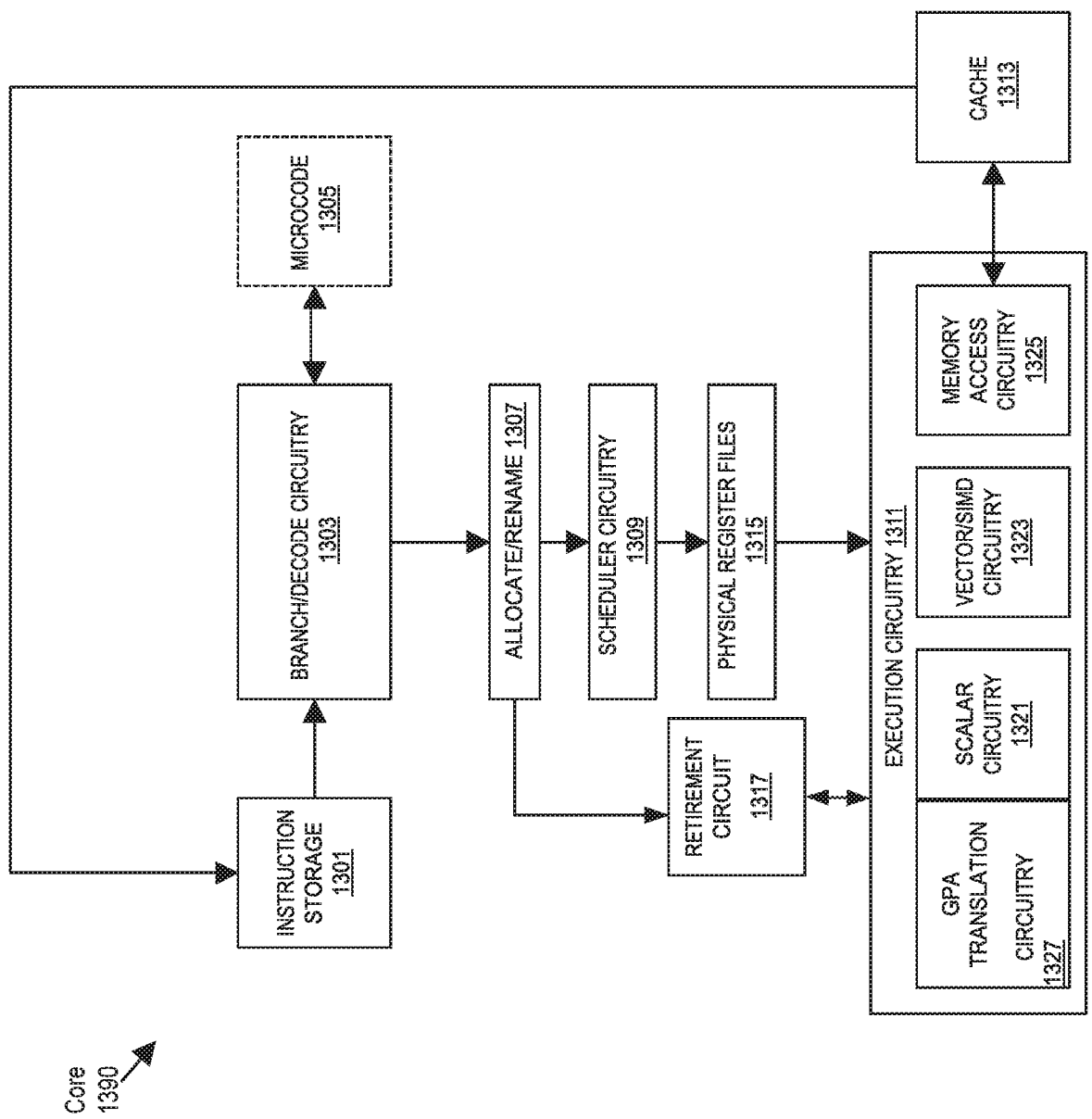
FIG. 5 illustrates an embodiment of a processor core pipeline supporting GPA translation operations according to some embodiments.

FIG. 5 illustrates an embodiment of a processor core pipeline supporting GPA translation instruction operations.

Branch prediction and decode circuitry 1303 performs branch predicting of instructions, decoding of instructions, and/or both from instructions stored in instruction storage 1301. For example, instructions detailed herein may be stored in instruction storage. In some implementations, separate circuitry is used for branch prediction and in some embodiments, at least some instructions are decoded into one or more micro-operations, micro-code entry points, microinstructions, other instructions, or other control signals using microcode 1305. The branch prediction and decode circuitry 1303 may be implemented using various different mechanisms. Examples of suitable mechanisms include, but are not limited to, look-up tables, hardware implementations, programmable logic arrays (PLAs), microcode read only memories (ROMs), etc.

The branch prediction and decode circuitry 1303 is coupled to allocate/rename 1307 circuitry which is coupled, in some embodiments, to scheduler circuitry 1309. In some embodiments, these circuits provide register renaming, register allocation, and/or scheduling functionality by performing one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

The scheduler circuitry 1309 represents any number of different schedulers, including reservations stations, central instruction window, etc. The scheduler circuitry 1309 is coupled to, or includes, physical register file(s) 1315. Each of the physical register file(s) 1315 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), tiles, etc. In one embodiment, the physical register file(s) 1315 comprises vector registers circuitry, write mask registers circuitry, and scalar registers circuitry. These register circuits may provide architectural vector registers, vector mask registers, and general-purpose registers. The physical register file(s) 1315 is overlapped by a retirement circuit 1317 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement circuit 1317 and the physical register file(s) 1315 are coupled to the execution circuitry 1311.

While register renaming is described in the context of out-of-order execution, it should be understood that register renaming may be used in an in-order architecture.

While the illustrated embodiment of the processor may also include separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all the cache may be external to the core and/or the processor.

The execution circuitry 1311 is a set of one or more execution circuits, including scalar circuitry 1321, vector/single instruction multiple data (SIMD) circuitry 1323, and matrix operations circuitry 1327, as well as memory access circuitry 1325 to access cache 1313. The execution circuits perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scalar circuitry 1321 performs scalar operations, the vector/SIMD circuitry 1323 performs vector/SIMD operations, and GPA translation operations circuitry 1327 performs GPA translation operations detailed herein.

By way of example, the exemplary register renaming, out-of-order issue/execution core architecture may implement a pipeline as follows: 1) an instruction fetch circuit performs fetch and length decoding stages; 2) the branch and decode circuitry 1303 performs a decode stage; 3) the allocate/rename 1307 circuitry performs an allocation stage and renaming stage; 4) the scheduler circuitry 1309 performs a schedule stage; 5) physical register file(s) (coupled to, or included in, the scheduler circuitry 1309 and allocate/rename 1307 circuitry and a memory unit perform a register read/memory read stage; the execution circuitry 1311 performs an execute stage; 6) a memory unit and the physical register file(s) unit(s) perform a write back/memory write stage; 7) various units may be involved in the exception handling stage; and 8) a retirement unit and the physical register file(s) unit(s) perform a commit stage.

The core may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Figure 6:
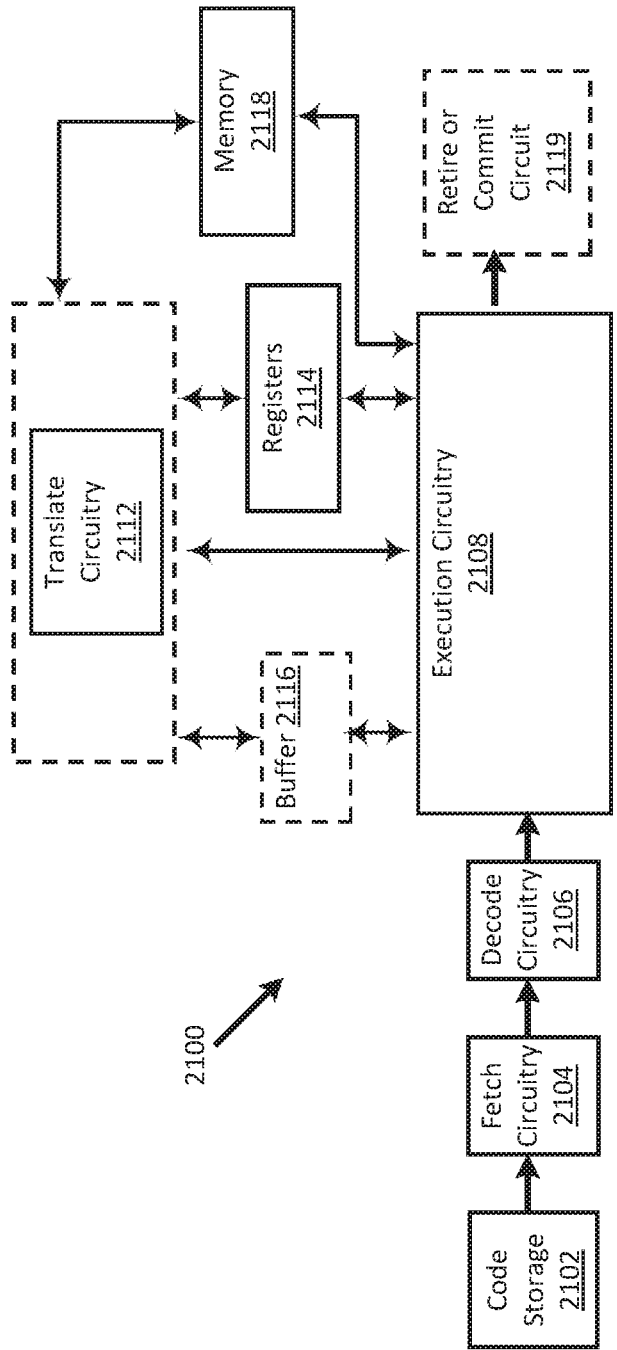
FIG. 6 illustrates a block diagram of hardware processing components used to execute GPA translation instructions, according to some embodiments.

FIG. 6 is a block diagram of hardware processing components used to execute GPA translation instructions, according to some embodiments. As shown, computing system 2100 includes code storage 2102 (to store GPA translation instructions), fetch circuitry 2104 (to fetch GPA translation instructions) and decode circuitry 2106 (to decode fetched instructions). Computing system 2100 further includes translation circuitry 2112, registers 2114, buffer 2116, memory 2118, and optionally, retire or commit circuit 2119. Translation circuitry 2112 is shown surrounded by a dashed border, which is to indicate that those circuits could in some embodiments be incorporated into execution circuitry 2108.

As shown, GPA translation instruction 2101 includes fields to specify an opcode (e.g., GPA Translate) 2101A, a destination vector location 2101B, operands 2101C, and a source vector location 2101D. As disclosed herein, source and destination vector locations identified by GPA translation instructions can be located in any of registers 2114, buffer 2116, and memory 2118.

In operation, computing system 2100 is to use fetch circuitry 2104 and decode circuitry 2106 to fetch and decode GPA translation instructions from code storage 2102. Execution circuitry is to respond to a decoded GPA translation instruction by using GPA translation circuitry 2112 to respond to GPA translation instructions.

Figure 7:
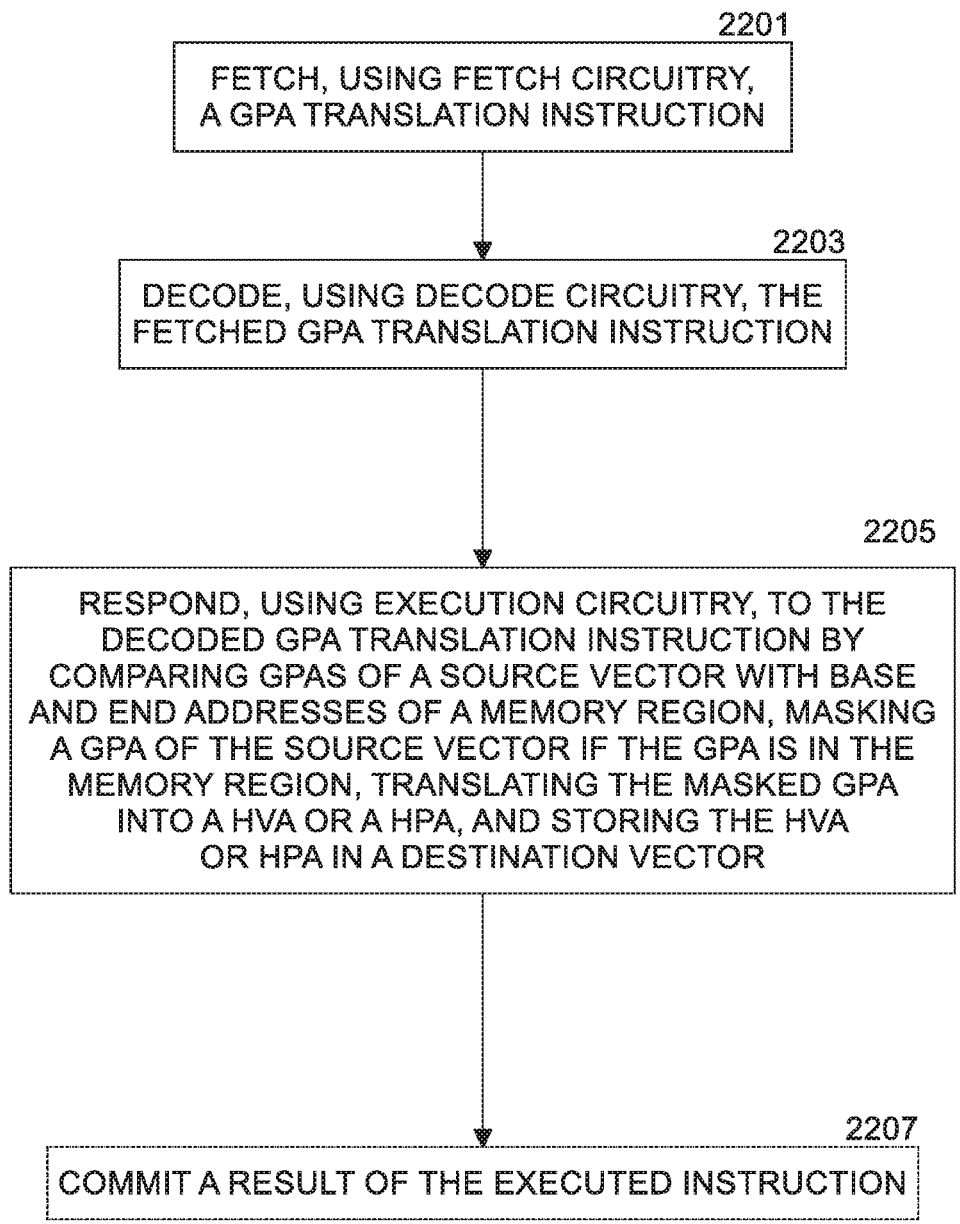
FIG. 7 illustrates a processing flow of a processor executing a GPA translation instruction according to some embodiments.

FIG. 7 illustrates an embodiment of a processor executing a GPA translation instruction. At 2201, the processor is to fetch, using fetch circuitry, a GPA translation instruction. The fetched GPA translation instruction is decoded at 2203. For example, the fetched GPA translation instruction is decoded by decode circuitry such as that detailed herein.

At 2205, the processor is to respond, using execution circuitry, by comparing GPAs of a source vector with base and end addresses of a memory region, masking a GPA of the source vector if the GPA is in the memory region; translating the masked GPA into a HVA or a HPA; and storing the HVA or HPA into a destination vector. The translating and storing operations are performed for every masked GPA.

In some embodiments, the executed instruction is committed or retired at 2207 which is optional (as indicated by its dashed border) insofar as it may occur at a different time, or not at all.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality.

Exemplary core architectures are described next, followed by descriptions of exemplary processors and computer architectures.

Figure 8A:
FIG. 8A is a block diagram illustrating both an exemplary in-order pipeline and an exemplary register renaming, out-of-order issue/execution pipeline according to embodiments.
Figure 8B:
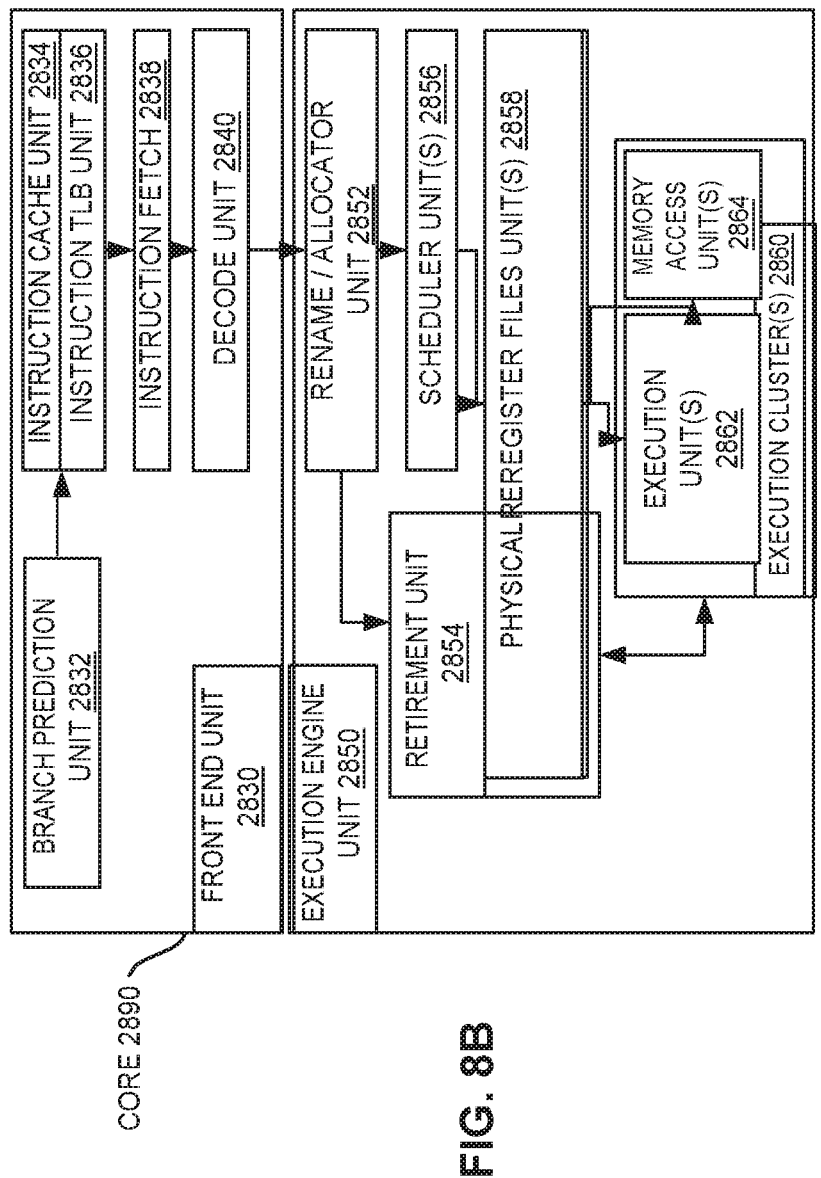
FIG. 8B is a block diagram illustrating both an exemplary embodiment of an in-order architecture core and an exemplary register renaming, out-of-order issue/execution architecture core to be included in a processor according to embodiments.

FIG. 8A is a block diagram illustrating both an exemplary in-order pipeline and an exemplary register renaming, out-of-order issue/execution pipeline according to embodiments. FIG. 8B is a block diagram illustrating both an exemplary embodiment of an in-order architecture core and an exemplary register renaming, out-of-order issue/execution architecture core to be included in a processor according to embodiments. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 2800 includes a fetch stage 2802, a length decode stage 2804, a decode stage 2806, an allocation stage 2808, a renaming stage 2810, a scheduling (also known as a dispatch or issue) stage 2812, a register read/memory read stage 2814, an execute stage 2816, a write back/memory write stage 2818, an exception handling stage 2822, and a commit stage 2824.

FIG. 8B shows processor core 2890 including a front-end unit 2830 coupled to an execution engine unit 2850, and both are coupled to a memory unit 2870. The core 2890 may be a reduced instruction set computing (RISC) core, a complex instruction set computing (CISC) core, a very long instruction word (VLIW) core, or a hybrid or alternative core type. As yet another option, the core 2890 may be a special-purpose core, such as, for example, a network or communication core, compression engine, coprocessor core, general purpose computing graphics processing unit (GPGPU) core, graphics core, or the like.

The front-end unit 2830 includes a branch prediction unit 2832 coupled to an instruction cache unit 2834, which is coupled to an instruction translation lookaside buffer (TLB) 2836, which is coupled to an instruction fetch unit 2838, which is coupled to a decode unit 2840. The decode unit 2840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 2840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2890 includes a microcode ROM or other medium that stores microcode for certain macroinstructions (e.g., in decode unit 2840 or otherwise within the front-end unit 2830). The decode unit 2840 is coupled to a rename/allocator unit 2852 in the execution engine unit 2850.

The execution engine unit 2850 includes the rename/allocator unit 2852 coupled to a retirement unit 2854 and a set of one or more scheduler unit(s) 2856. The scheduler unit(s) 2856 represents any number of different schedulers, including reservations stations, central instruction window, etc. The scheduler unit(s) 2856 is coupled to the physical register file(s) unit(s) 2858. Each of the physical register file(s) units 2858 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit 2858 comprises a vector registers unit, a write mask registers unit, and a scalar registers unit. These register units may provide architectural vector registers, vector mask registers, and general-purpose registers. The physical register file(s) unit(s) 2858 is overlapped by the retirement unit 2854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2854 and the physical register file(s) unit(s) 2858 are coupled to the execution cluster(s) 2860. The execution cluster(s) 2860 includes a set of one or more execution units 2862 and a set of one or more memory access units 2864. The execution units 2862 may perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scheduler unit(s) 2856, physical register file(s) unit(s) 2858, and execution cluster(s) 2860 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2864). It should also be understood that where separate pipelines are used, one or more of these pipelines may be out-of-order issue/execution and the rest in-order.

The set of memory access units 2864 is coupled to the memory unit 2870, which includes a data TLB unit 2872 coupled to a data cache unit 2874 coupled to a level 2 (L2) cache unit 2876. In one exemplary embodiment, the memory access units 2864 may include a load unit, a store address unit, and a store data unit, each of which is coupled to the data TLB unit 2872 in the memory unit 2870. The instruction cache unit 2834 is further coupled to a level 2 (L2) cache unit 2876 in the memory unit 2870. The L2 cache unit 2876 is coupled to one or more other levels of cache and eventually to a main memory.

By way of example, the exemplary register renaming, out-of-order issue/execution core architecture may implement the pipeline 2800 as follows: 1) the instruction fetch 2838 performs the fetch and length decoding stages 2802 and 2804; 2) the decode unit 2840 performs the decode stage 2806; 3) the rename/allocator unit 2852 performs the allocation stage 2808 and renaming stage 2810; 4) the scheduler unit(s) 2856 performs the schedule stage 2812; 5) the physical register file(s) unit(s) 2858 and the memory unit 2870 perform the register read/memory read stage 2814; the execution cluster 2860 perform the execute stage 2816; 6) the memory unit 2870 and the physical register file(s) unit(s) 2858 perform the write back/memory write stage 2818; 7) various units may be involved in the exception handling stage 2822; and 8) the retirement unit 2854 and the physical register file(s) unit(s) 2858 perform the commit stage 2824.

The core 2890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture.

While the illustrated embodiment of the processor also includes separate instruction and data cache units 2834/2874 and a shared L2 cache unit 2876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9B:
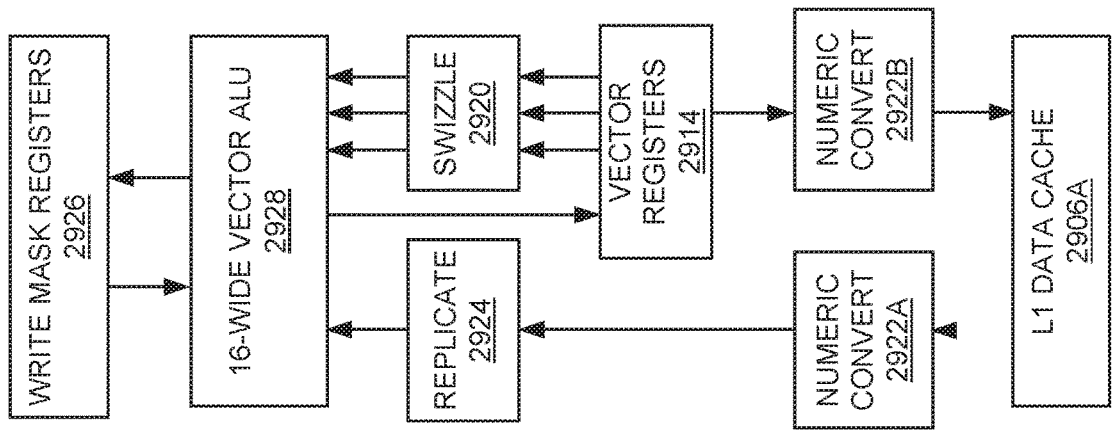
FIG. 9B is an expanded view of part of the processor core in FIG. 9A according to embodiments.
Figure 9A:
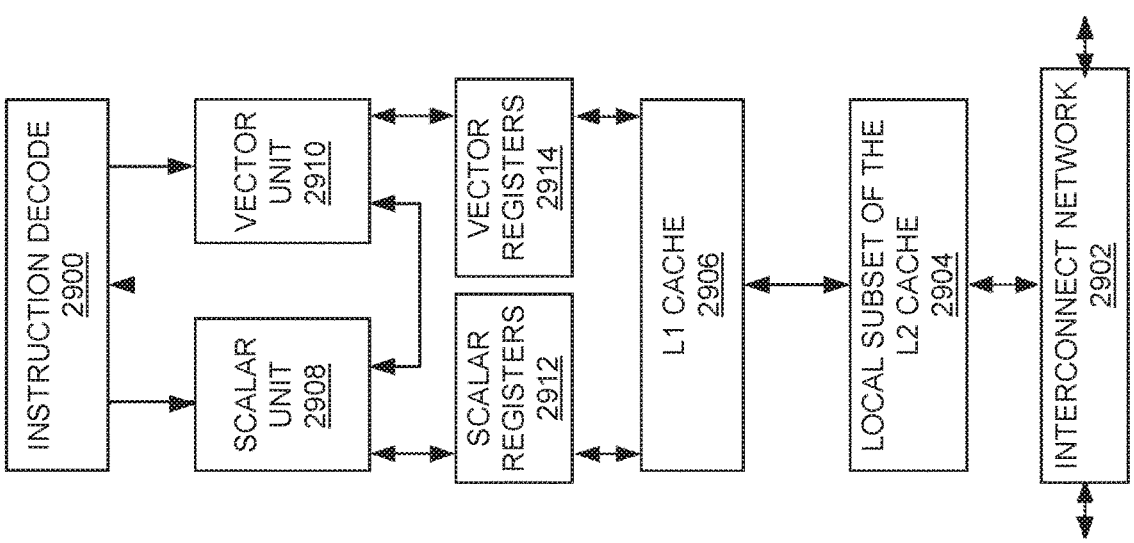
FIG. 9A is a block diagram of a single processor core, along with its connection to the on-die interconnect network and with its local subset of the Level 2 (L2) cache, according to embodiments.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 2902 and with its local subset of the Level 2 (L2) cache 2904, according to embodiments. In one embodiment, an instruction decoder 2900 supports the x86 instruction set with a packed data instruction set extension. An L1 cache 2906 allows low-latency accesses to cache memory into the scalar and vector units. While in one embodiment (to simplify the design), a scalar unit 2908 and a vector unit 2910 use separate register sets (respectively, scalar registers 2912 and vector registers 2914) and data transferred between them is written to memory and then read back in from a level 1 (L1) cache 2906, alternative embodiments may use a different approach (e.g., use a single register set or include a communication path that allow data to be transferred between the two register files without being written and readback).

The local subset of the L2 cache 2904 is part of a global L2 cache that is divided into separate local subsets, one per processor core. Each processor core has a direct access path to its own local subset of the L2 cache 2904. Data read by a processor core is stored in its L2 cache subset 2904 and can be accessed quickly, in parallel with other processor cores accessing their own local L2 cache subsets. Data written by a processor core is stored in its own L2 cache subset 2904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments. FIG. 9B includes an L1 data cache 2906A part of the L1 cache 2904, as well as more detail regarding the vector unit 2910 and the vector registers 2914.

Specifically, the vector unit 2910 is a 16-wide vector processing unit (VPU) (see the 16-wide ALU 2928), which executes one or more of integer, single-precision float, and double-precision float instructions. The VPU supports swizzling the register inputs with swizzle unit 2920, numeric conversion with numeric convert units 2922A-B, and replication with replication unit 2924 on the memory input. Write mask registers 2926 allow predicating resulting vector writes.

Figure 10:
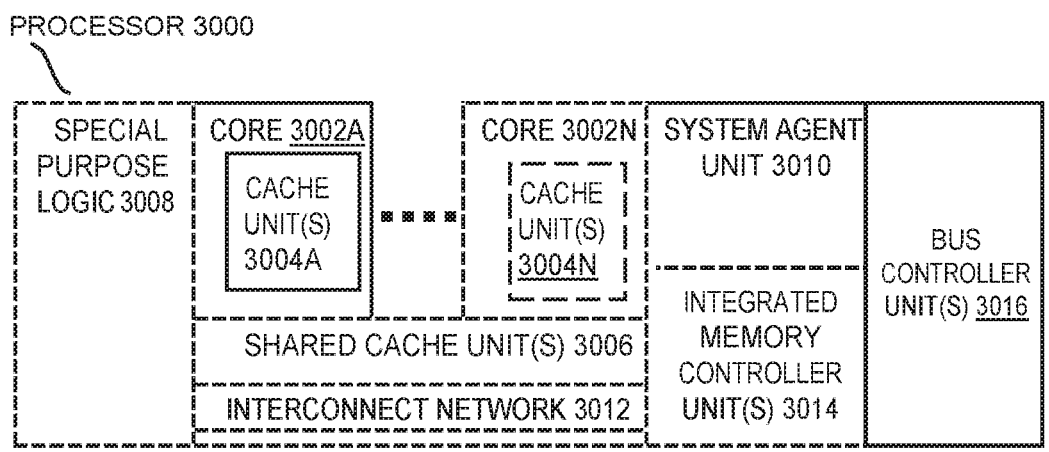
FIG. 10 is a block diagram of a processor that may have more than one core, may have an integrated memory controller, and may have integrated graphics according to embodiments.

FIG. 10 is a block diagram of a processor 3000 that may have more than one core, may have an integrated memory controller, and may have integrated graphics according to embodiments. The solid lined boxes in FIG. 10 illustrate a processor 3000 with a single core 3002A, a system agent 3010, a set of one or more bus controller units 3016, while the optional addition of the dashed lined boxes illustrates an alternative processor 3000 with multiple cores 3002A-N, a set of one or more integrated memory controller unit(s) 3014 in the system agent unit 3010, and special purpose logic 3008.

Thus, different implementations of the processor 3000 may include: 1) a CPU with the special purpose logic 3008 being integrated graphics and/or scientific (throughput) logic (which may include one or more cores), and the cores 3002A-N being one or more general purpose cores (e.g., general purpose in-order cores, general purpose out-of-order cores, a combination of the two); 2) a coprocessor with the cores 3002A-N being a large number of special purpose cores intended primarily for graphics and/or scientific (throughput); and 3) a coprocessor with the cores 3002A-N being a large number of general purpose in-order cores. Thus, the processor 3000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 3000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 3006, and external memory (not shown) coupled to the set of integrated memory controller units 3014. The set of shared cache units 3006 may include one or more mid-level caches, such as level 2 (L2), level 3 (L3), level 4 (L4), or other levels of cache, a last level cache (LLC), and/or combinations thereof. While in one embodiment a ring based interconnect unit 3012 interconnects the special purpose logic 3008 (integrated graphics logic is an example of and is also referred to herein as special purpose logic), the set of shared cache units 3006, and the system agent unit 3010/integrated memory controller unit(s) 3014, alternative embodiments may use any number of well-known techniques for interconnecting such units. In one embodiment, coherency is maintained between one or more cache units 3006 and cores 3002A-N.

In some embodiments, one or more of the cores 3002A-N are capable of multi-threading. The system agent 3010 includes those components coordinating and operating cores 3002A-N. The system agent unit 3010 may include for example a power control unit (PCU) and a display unit. The PCU may be or include logic and components needed for regulating the power state of the cores 3002A-N and the special purpose logic 3008. The display unit is for driving one or more externally connected displays.

The cores 3002A-N may be homogenous or heterogeneous in terms of architecture instruction set; that is, two or more of the cores 3002A-N may be capable of execution the same instruction set, while others may be capable of executing only a subset of that instruction set or a different instruction set.

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
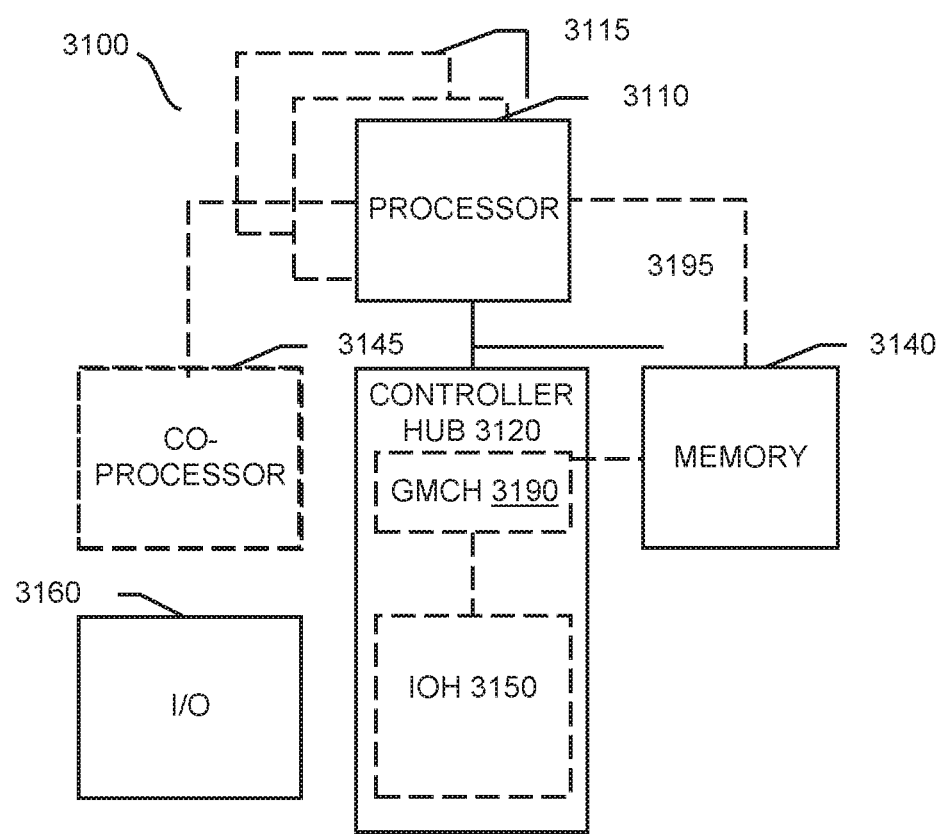
FIG. 11 is a block diagram of a computing system in accordance with one embodiment of the present invention.

Referring now to FIG. 11, shown is a block diagram of a system 3100 in accordance with one embodiment of the present invention. The system 3100 may include one or more processors 3110, 3115, which are coupled to a controller hub 3120. In one embodiment the controller hub 3120 includes a graphics memory controller hub (GMCH) 3190 and an Input/Output Hub (IOH) 3150 (which may be on separate chips); the GMCH 3190 includes memory and graphics controllers to which are coupled memory 3140 and a coprocessor 3145; the IOH 3150 couples input/output (I/O) devices 3160 to the GMCH 3190.

Alternatively, one or both of the memory and graphics controllers are integrated within the processor (as described herein), the memory 3140 and the coprocessor 3145 are coupled directly to the processor 3110, and the controller hub 3120 in a single chip with the IOH 3150.

The optional nature of additional processors 3115 is denoted in FIG. 11 with broken lines. Each processor 3110, 3115 may include one or more of the processing cores described herein and may be some version of the processor 3000.

The memory 3140 may be, for example, dynamic random-access memory (DRAM), phase change memory (PCM), or a combination of the two. For at least one embodiment, the controller hub 3120 communicates with the processor(s) 3110, 3115 via a multi-drop bus, such as a frontside bus (FSB), point-to-point interface such as QuickPath Interconnect (QPI), or similar connection 3195.

In one embodiment, the coprocessor 3145 is a special-purpose processor, such as, for example, a high-throughput MIC processor, a network or communication processor, compression engine, graphics processor, GPGPU, embedded processor, or the like. In one embodiment, controller hub 3120 may include an integrated graphics accelerator.

There can be a variety of differences between the physical resources 3110, 3115 in terms of a spectrum of metrics of merit including architectural, microarchitectural, thermal, power consumption characteristics, and the like.

In one embodiment, the processor 3110 executes instructions that control data processing operations of a general type. Embedded within the instructions may be coprocessor instructions. The processor 3110 recognizes these coprocessor instructions as being of a type that should be executed by the attached coprocessor 3145. Accordingly, the processor 3110 issues these coprocessor instructions (or control signals representing coprocessor instructions) on a coprocessor bus or other interconnect, to coprocessor 3145. Coprocessor(s) 3145 accept and execute the received coprocessor instructions.

Figure 12:
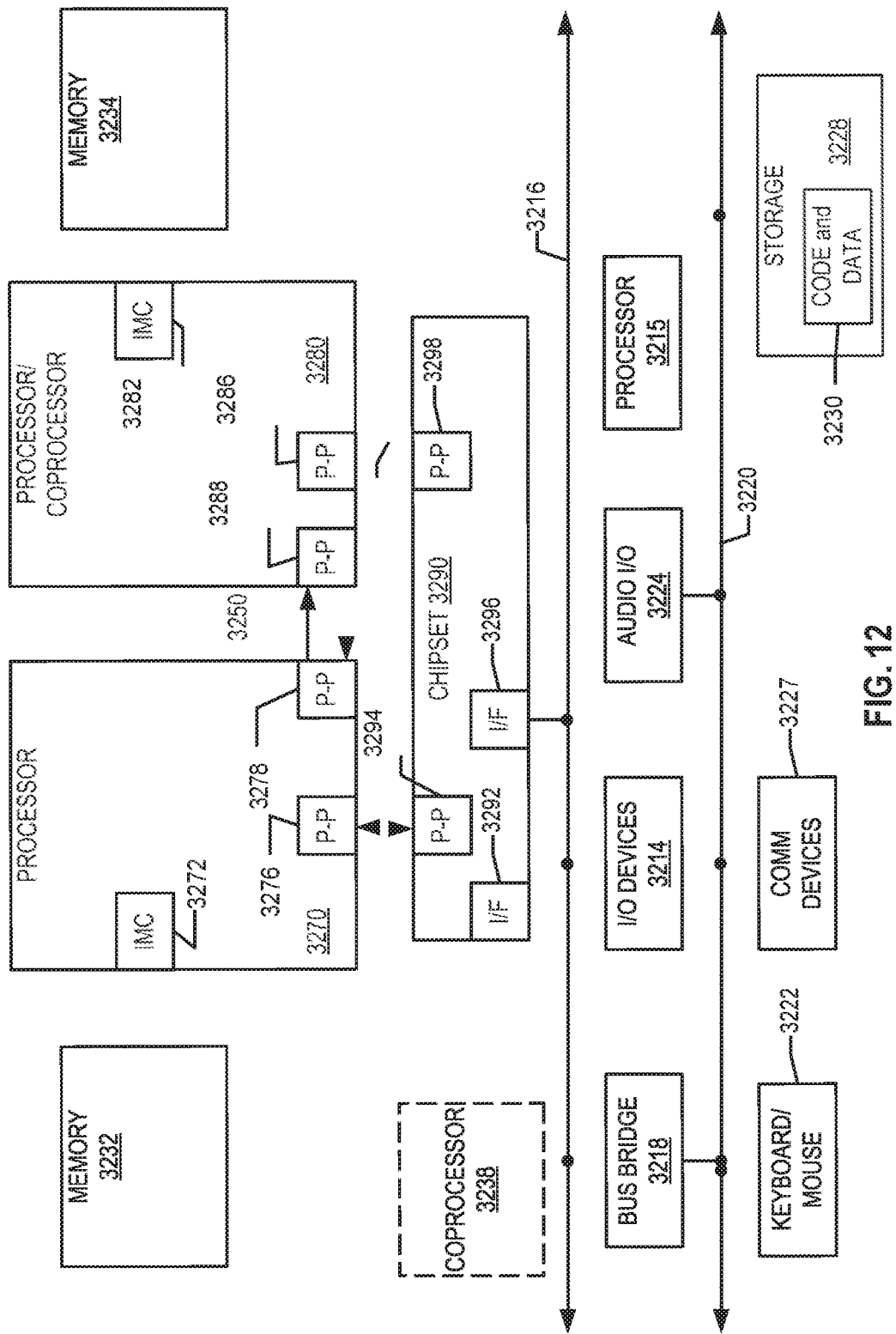
FIG. 12 is a block diagram of a first more specific exemplary computing system in accordance with an embodiment of the present invention.

Referring now to FIG. 12, shown is a block diagram of a first more specific exemplary system 3200 in accordance with an embodiment of the present invention. As shown in FIG. 12, multiprocessor system 3200 is a point-to-point interconnect system, and includes a first processor 3270 and a second processor 3280 coupled via a point-to-point interconnect 3250. Each of processors 3270 and 3280 may be some version of the processor 3000. In one embodiment, processors 3270 and 3280 are respectively processors 3110 and 3115, while coprocessor 3238 is coprocessor 3145. In another embodiment, processors 3270 and 3280 are respectively processor 3110 coprocessor 3145.

Processors 3270 and 3280 are shown including integrated memory controller (IMC) units 3272 and 3282, respectively. Processor 3270 also includes as part of its bus controller units point-to-point (P-P) interfaces 3276 and 3278; similarly, second processor 3280 includes P-P interfaces 3286 and 3288. Processors 3270, 3280 may exchange information via a point-to-point (P-P) interface 3250 using P-P interface circuits 3278, 3288. As shown in FIG. 12, IMCs 3272 and 3282 couple the processors to respective memories, namely a memory 3232 and a memory 3234, which may be portions of main memory locally attached to the respective processors.

Processors 3270, 3280 may each exchange information with a chipset 3290 via individual P-P interfaces 3252, 3254 using point to point interface circuits 3276, 3294, 3286,

3298. Chipset 3290 may optionally exchange information with the coprocessor 3238 via a high-performance interface 3292. In one embodiment, the coprocessor 3238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 3290 may be coupled to a first bus 3216 via an interface 3296. In one embodiment, first bus 3216 may be a Peripheral Component Interconnect (PCI) bus, or a bus such as a PCI Express bus or another third generation I/O interconnect bus, although the scope of the present invention is not so limited.

As shown in FIG. 12, various I/O devices 3214 may be coupled to first bus 3216, along with a bus bridge 3218 which couples first bus 3216 to a second bus 3220. In one embodiment, one or more additional processor(s) 3215, such as coprocessors, high-throughput MIC processors, GPGPU's, accelerators (such as, e.g., graphics accelerators or digital signal processing (DSP) units), field programmable gate arrays, or any other processor, are coupled to first bus 3216. In one embodiment, second bus 3220 may be a low pin count (LPC) bus. Various devices may be coupled to a second bus 3220 including, for example, a keyboard and/or mouse 3222, communication devices 3227 and a storage unit 3228 such as a disk drive or other mass storage device which may include instructions/code and data 3230, in one embodiment. Further, an audio I/O 3224 may be coupled to the second bus 3220. Note that other architectures are possible. For example, instead of the point-to-point architecture of FIG. 12, a system may implement a multi-drop bus or other such architecture.

Figure 13:
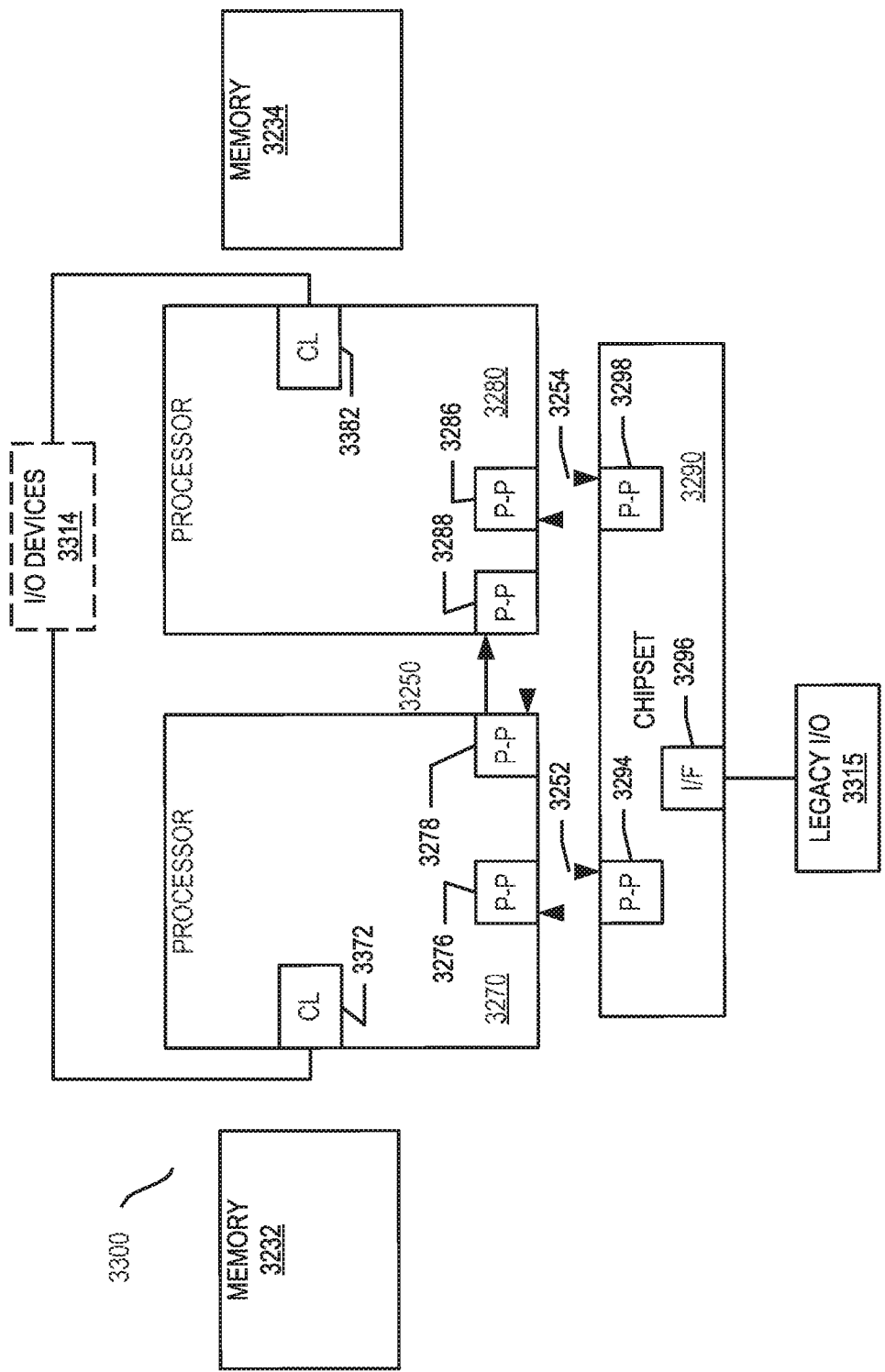
FIG. 13 is a block diagram of a second more specific exemplary computing system in accordance with an embodiment of the present invention.

Referring now to FIG. 13, shown is a block diagram of a second more specific exemplary system 3300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 3270, 3280 may include integrated memory and I/O control logic ("CL") 3372 and 3382, respectively. Thus, the CL 3372, 3382 include integrated memory controller units and include I/O control logic. FIG. 13 illustrates that not only are the memories 3232, 3234 coupled to the CL 3372, 3382, but also that I/O devices 3314 are also coupled to the control logic 3372, 3382. Legacy I/O devices 3315 are coupled to the chipset 3290.

Figure 14:
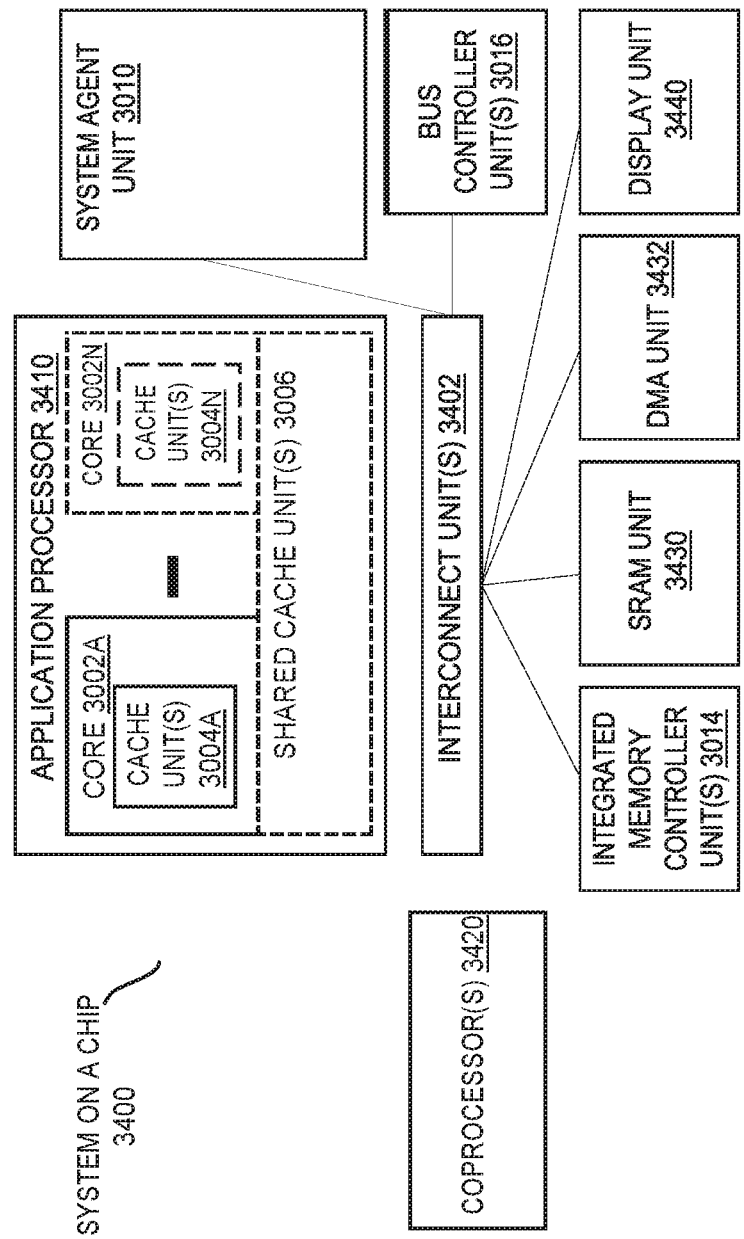
FIG. 14 is a block diagram of a System-on-a-Chip (SoC) in accordance with an embodiment of the present invention.

Referring now to FIG. 14, shown is a block diagram of a system on a chip (SoC) 3400 in accordance with an embodiment of the present invention. Similar elements in FIG. 10 bear like reference numerals. Also, dashed lined boxes are optional features on more advanced SoCs. In FIG. 14, an interconnect unit(s) 3402 is coupled to: an application processor 3410 which includes a set of one or more cores 3002A-N, which include cache units 3004A-N, and shared cache unit(s) 3006; a system agent unit 3010; a bus controller unit(s) 3016; an integrated memory controller unit(s) 3014; a set or one or more coprocessors 3420 which may include integrated graphics logic, an image processor, an audio processor, and a video processor; an static random access memory (SRAM) unit 3430; a direct memory access (DMA) unit 3432; and a display unit 3440 for coupling to one or more external displays. In one embodiment, the coprocessor(s) 3420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 3230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
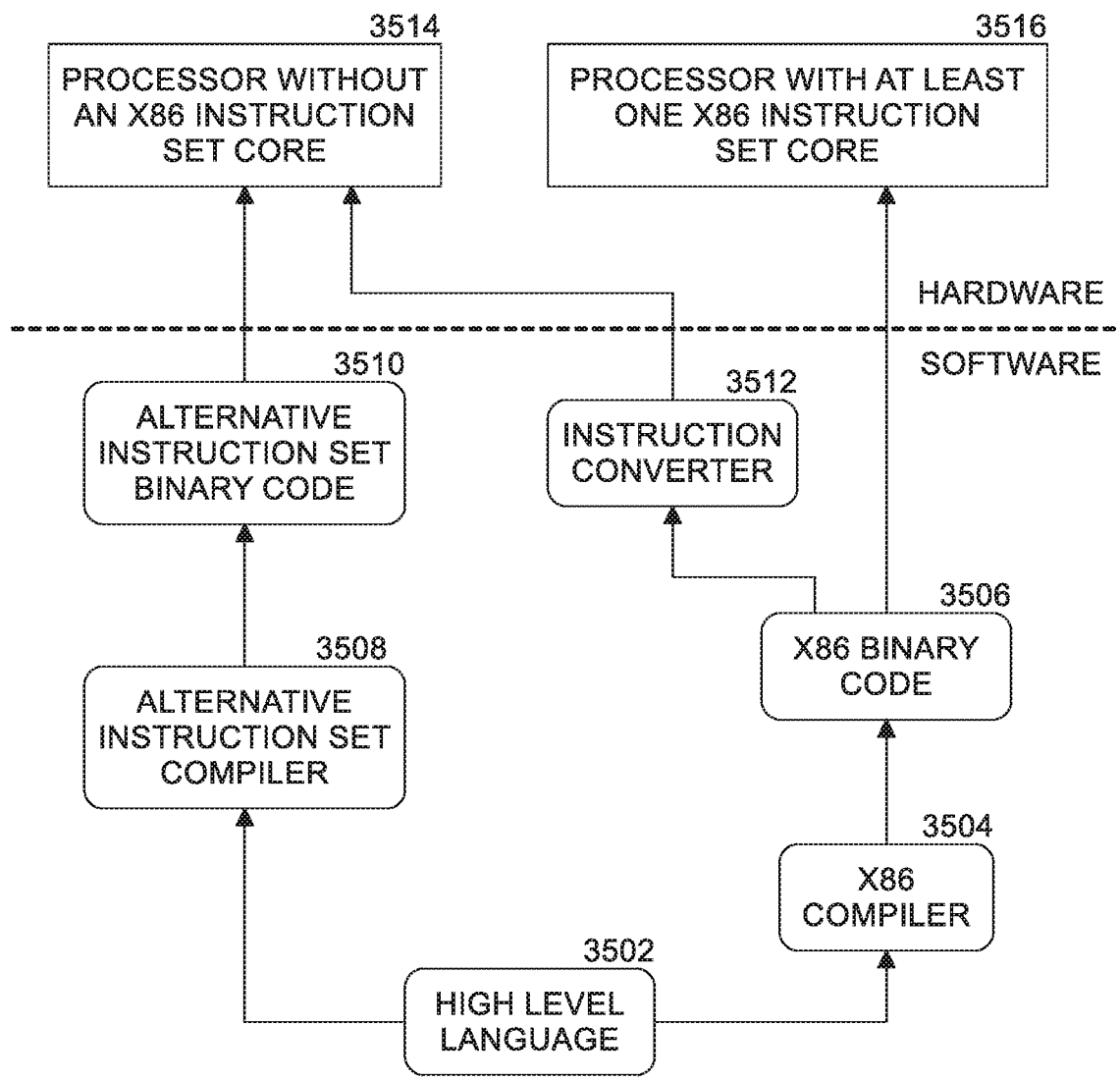
FIG. 15 is a block diagram contrasting the use of a software instruction converter to convert binary instructions in a source instruction set to binary instructions in a target instruction set according to embodiments.

FIG. 15 is a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 15 shows a program in a high-level language 3502 may be compiled using an x86 compiler 3504 to generate x86 binary code 3506 that may be natively executed by a processor with at least one x86 instruction set core 3516. The processor with at least one x86 instruction set core 3516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 3504 represents a compiler that is operable to generate x86 binary code 3506 (e.g., object code) that can, with or without additional linkage processing, be executed on the processor with at least one x86 instruction set core 3516. Similarly, FIG. 15 shows the program in the high level language 3502 may be compiled using an alternative instruction set compiler 3508 to generate alternative instruction set binary code 3510 that may be natively executed by a processor without at least one x86 instruction set core 3514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3512 is used to convert the x86 binary code 3506 into code that may be natively executed by the processor without an x86 instruction set core 3514. This converted code is not likely to be the same as the alternative instruction set binary code 3510 because an instruction converter capable of this is difficult to make; however, the converted code will accomplish the general operation and be made up of instructions from the alternative instruction set. Thus, the instruction converter 3512 represents software, firmware, hardware, or a combination thereof that, through emulation, simulation or any other process, allows a processor or other electronic device that does not have an x86 instruction set processor or core to execute the x86 binary code 3506.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A processor comprising:
    fetch circuitry to fetch a vector guest physical address translation instruction having a format with fields to specify at least
        vector guest physical address translation opcode,
        an address of a source vector, the source vector including a plurality of guest physical addresses,
        an address of a base array of vectors, elements of a vector of the base array having starting addresses for memory regions,
        an address of an end array of vectors, elements of a vector of the end array having ending addresses for the memory regions, and an address of a destination vector, the destination vector to store a plurality of host addresses translated from the guest physical addresses, and decode circuitry to decode the fetched vector guest physical address translation instruction, and execution circuitry, responsive to the decoded vector guest physical address translation instruction, to:

compare the guest physical addresses of the source vector in parallel with selected memory regions defined by the starting addresses in the base array of vectors and the ending addresses in the end array of vectors;

mask a guest physical address of the source vector if the guest physical address is in one of the selected memory regions;

translate the masked guest physical addresses into host addresses; and store the host addresses into the destination vector.

2. The processor of claim 1, comprising loading guest physical addresses into the source vector.

3. The processor of claim 1, wherein the host addresses are host virtual addresses.

4. The processor of claim 1, wherein the host addresses are host physical addresses.

5. The processor of claim 1, comprising repeating translating and storing for each masked guest physical address.

6. The processor of claim 1, comprising repeating comparing, masking, translating and storing for a plurality of memory regions.

7. The processor of claim 1, comprising returning the destination vector when all guest physical addresses in the source vector have been translated.

8. The processor of claim 1, comprising returning an error when all selected memory regions have been processed for the guest physical addresses of the source vector but no guest physical address is masked.

9. A method to be performed by a processor, comprising:

fetching a vector guest physical address translation instruction having a format with fields to specify at least vector guest physical address translation opcode, an address of a source vector, the source vector including a plurality of guest physical addresses, an address of a base array of vectors, elements of a vector of the base array having starting addresses for memory regions, an address of an end array of vectors, elements of a vector of the end array having ending addresses for the memory regions, and an address of a destination vector, the destination vector to store a plurality of host addresses translated from the guest physical addresses, and decoding the fetched vector guest physical address translation instruction, and executing the decoded vector guest physical address translation instruction, to:

compare the guest physical addresses of the source vector in parallel with selected memory regions defined by the starting addresses in the base array of vectors and the ending addresses in the end array of vectors;

mask a guest physical address of the source vector if the guest physical address is in one of the selected memory regions;

translate the masked guest physical addresses into host addresses; and store the host addresses into the destination vector.

10. The method of claim 9, comprising loading guest physical addresses into the source vector.

11. The method of claim 9, wherein the host addresses are host virtual addresses.

12. The method of claim 9, wherein the host addresses are host physical addresses.

13. The method of claim 9, comprising repeating translating and storing for each masked guest physical address.

14. The method of claim 9, comprising repeating comparing, masking, translating and storing for a plurality of memory regions.

15. The method of claim 9, comprising returning the destination vector when all guest physical addresses in the source vector have been translated.

16. The method of claim 9, comprising returning an error when all selected memory regions have been processed for the guest physical addresses of the source vector but no guest physical address is masked.

17. At least one non-transitory tangible machine-readable medium comprising a plurality of instructions that in response to being executed by a processor cause the processor to:

fetch a guest physical address translation instruction having a format with fields to specify at least vector guest physical address translation opcode, an address of a source vector, the source vector including a plurality of guest physical addresses, an address of a base array of vectors, elements of a vector of the base array having starting addresses for memory regions, an address of an end array of vectors, elements of a vector of the end array having ending addresses for the memory regions, and an address of a destination vector, the destination vector to store a plurality of host addresses translated from the guest physical addresses, and decode the fetched guest physical address translation instruction, and execute the decoded guest physical address translation instruction, by comparing the guest physical addresses of the source vector in parallel with selected memory regions defined by the starting addresses in the base array of vectors and the ending addresses in the end array of vectors;

masking a guest physical address of the source vector if the guest physical address is in one of the selected memory regions;

translating the masked guest physical addresses into host addresses; and storing the host addresses into the destination vector.

18. The at least one non-transitory tangible machine-readable medium of claim 17, wherein the host addresses are host virtual addresses.

19. The at least one non-transitory tangible machine-readable medium of claim 17, wherein the host addresses are host physical addresses.

20. The at least one non-transitory tangible machine-readable medium of claim 17, comprising instructions to repeat translating and storing for each masked guest physical address.

21. The at least one non-transitory tangible machine-readable medium of claim 17, comprising instructions to repeat comparing, masking, translating and storing for a plurality of memory regions.

22. The processor of claim 1, wherein the guest physical address translation instruction comprises a number of elements in the source vector.

23. The processor of claim 1, wherein the guest physical address translation instruction comprises a number of elements in the base array.

* * * * *